Figure 1:
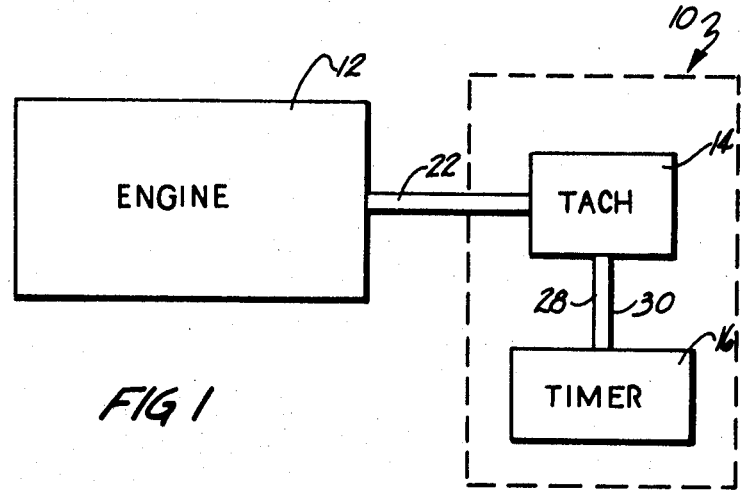

United States Patent
Dileski

[15] 3,636,703
[45] Jan. 25, 1972

[54] ENGINE PERFORMANCE INSTRUMENT
[72] Inventor: Douglas K. Dileski, 418 College Ave., Holland, Mich. 49423
[22] Filed: Oct. 7, 1965
[21] Appl. No.: 493,654

[52] U.S. Cl. .............................. 58/146, 73/117.2, 324/162
[51] Int. Cl. ................................. G07c 3/02, G01m 15/00
[58] Field of Search ................... 73/116, 517, 128, 129, 2; 116/116, 136.5; 235/104; 58/146, 147, 39.5; 346/18, 20; 340/262; 324/160

[56] References Cited

UNITED STATES PATENTS

| | | | |
|---|---|---|---|
| 2,182,572 | 12/1939 | Schnell | 116/136.5 |
| 2,933,363 | 4/1960 | Riegger | 346/18 X |
| 3,104,146 | 9/1963 | Cool et al. | 346/18 |
| 3,289,471 | 12/1966 | Maxwell | 73/117 |
| 2,216,737 | 10/1940 | Crane et al. | 73/187 |
| 2,365,601 | 12/1944 | Sipman | 58/145 X |
| 2,392,951 | 1/1946 | Salisbury | 58/145 X |

OTHER PUBLICATIONS

Consumer Reports, Sept. 1963 pages 446 and 447

Primary Examiner—Richard B. Wilkinson
Assistant Examiner—Stanley A. Wal
Attorney—Price & Heneveld

[57] ABSTRACT

An instrument for accurately measuring the elapsed time between a low and a high r.p.m. value which is required for an internal combustion engine undergoing maximum acceleration, comprised of a tachometer for monitoring the engine speed, electrical pickoffs connected to the tachometer to provide a triggering output signal at a selected low and a selected high engine speed, and an electrically triggered timer coupled to the pickoffs to be turned on and off by the first and second pickoff signals, to thereby measure the elapsed time between receipt of the same.

9 Claims, 2 Drawing Figures

PATENTED JAN 25 1972 3,636,703

INVENTOR.
DOUGLAS K. DILESKI
BY
ATTORNEYS

ENGINE PERFORMANCE INSTRUMENT

This invention relates to instruments for determining the performance of engines, especially internal combustion engines, and more particularly to a new form of instrument for precisely monitoring the actual acceleration characteristics of an engine so that the engine may be tuned to maximize these characteristics.

The tuning of internal combustion engines to obtain maximum performance from the engine is of an art of long standing. Initially, mechanics tuned engines by an intuitive process in which various parameters such as carburetion and ignition would be adjusted and the engine would then be run and accelerated while the mechanic listened to it to evaluate its performance. To some extent this process is still used, although a variety of instruments has now been developed for accurately monitoring various performance parameters so that much more accurate results may be obtained.

So far as measuring or determining actual engine operating performance (as distinguished from a particular parameter such as ignition) is concerned, the tachometer is a very useful instrument, as are the various forms of dynamometers. However, for maximizing engine performance, the tachometer is not particularly helpful, since it only indicates the actual maximum speed of a given engine.

Thus, if acceleration is to be maximized, the tachometer in itself is of very little assistance. Further, the dynamometer merely provides a measurement of horsepower under different conditions, specifically, the maximum horsepower which the engine will produce, at one specific engine speed setting and load condition. While horsepower is naturally related to some extent to the acceleration capabilities of an engine, this is not a direct relationship, and hence dynamometer readings are not actually a meaningful guide in tuning an engine to maximize its acceleration.

The present inventor has determined that the most useful guide in maximizing engine acceleration is an accurate measurement, and preferably a clear visual indication, of the actual time required for the engine to accelerate over a given range, e.g., from an initial low r.p.m. setting to an ultimate high r.p.m. level. That is, it is the contention of the present inventor that since an internal combustion engine produces its maximum horsepower over a relatively small portion of its range of operating speed, it is much more important for acceleration purposes to tune the engine so that it reaches the region of its maximum horsepower (power peak) in the shortest possible time, rather than to merely tune the engine to produce an ultimate or maximum horsepower rating at its power peak. Thus, by the practice of the present invention an engine will reach its power peak in the shortest possible time, regardless of what particular horsepower the power peak may actually produce.

Accordingly, it is a major objective of the present invention to provide an engine performance measurement instrument for monitoring the speed of the engine over a predetermined range and for accurately determining the exact time required for the engine to accelerate from one r.p.m. to a second and higher r.p.m.

A further important object of the present invention is to provide an engine performance instrument of the character described which utilizes existing tachometer instruments for continuously monitoring the speed of operation of the engine and for providing a visual indication of such speed, while simultaneously providing the acceleration timing which has been noted.

A further object of the invention is to provide an engine performance measurement instrument of the foregoing nature which includes the feature of adjusting the particular engine speed levels between which acceleration times are to be measured, so that a particular engine may be tuned for different conditions when desired.

The foregoing paramount objects of the invention, together with numerous other objects and a variety of advantages provided thereby, will become apparent to those skilled in the art upon a further consideration of the ensuing specification and its appended claims, particularly when taken in conjunction with the accompanying drawings illustrating preferred aspects of the invention.

Figure 2:
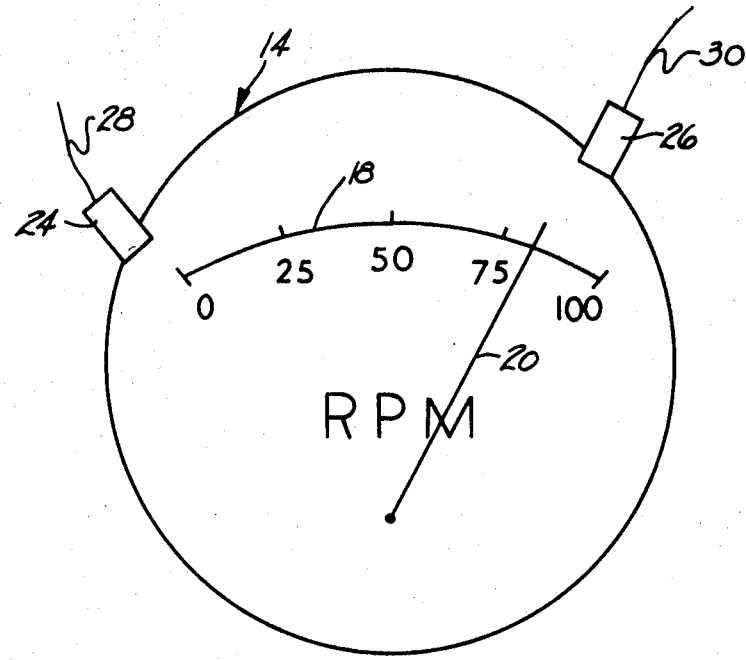

In the drawings:

FIG. 1 is a schematic representation in block form illustrating the interconnection of the components and elements utilized in the invention; and FIG. 2 is an illustrative instrument face of a typical tachometer instrument, illustrating certain details and features by which such a tachometer is integrated into the present composite instrument.

Briefly stated, the present invention provides an engine performance measurement instrument which includes a tachometer means connectable to an engine for continuously monitoring the speed at which the engine is operating, a first pickoff means operatively associated with the tachometer means for providing an output signal when the speed of the engine reaches a predetermined low value, a second pickoff means operatively associated with the tachometer means for providing an output signal when the speed of the engine reaches a predetermined high value, and a timing component coupled to each of the pickoff means, for receiving their respective output signals and measuring the time which elapses between their receipt, such that the acceleration of the engine between the two selected points may be precisely determined and the engine may be tuned to provide maximum acceleration between the selected speed levels and within the range of speed determined thereby.

Referring now in more detail to the drawings, the composite instrument 10 of the invention is seen connected to a typical internal combustion engine 12. More specifically, the composite instrument 10 includes a tachometer component 14 and a timer component 16. The instrument face of the tachometer 14 is illustrated in FIG. 2 from which it will be noted that this component includes a typical r.p.m. scale 18 and an indicating needle 20, by which particular engine r.p.m. readings may be visually determined.

The particular type of tachometer component which is selected for use is not a matter of essence to the invention, and it may have any conventional drive mechanism of either electrical or mechanical actuation, and including a meter movement of a known type for operation of the indicating needle 20. The composite instrument 10 is connected to a desired engine 12 by the tachometer drive coupling 22, which of course will be of a type suited to the particular tachometer mechanism which has been chosen.

It is to be noted that a pair of proximity switch means 24 and 26 (FIG. 2) are mounted relative to the instrument face of the tachometer component 14. A number of specific types of such switch means is available commercially, including such diversified types as mechanically actuated, electromagnetic, capacitive, and even optical, using miniaturized photocells and light sources. Essentially, the proximity switch means are position transducers or pickoffs, and they are mounted to the tachometer component so as to monitor the movement over the r.p.m. scale 18 of the indicating needle 20 by producing a signal (preferably an electrical pulse) whenever the needle moves past the particular switch means. Further, the proximity switch means or pickoffs are each preferably adjustably mounted relative to the instrument face and r.p.m. scale of the tachometer component, such that they may be moved to different locations relative thereto when desired, to change the point in the r.p.m. range at which they produce their pickoff signals. Each of the proximity switch means 24 and 26 has an output conductor 28 and 30, respectively, by which their pickoff signals may be coupled to other components for utilization.

From FIG. 1, it will be noted that output conductors 28 and 30 from proximity switch means 24 and 26 are connected to the timer component 16. This component is an electrically actuated timer which accurately measures the time difference between electrical pulses. Further, the timer should be of the manually resettable type, so that a reading which has already been obtained will not be inadvertently lost, and also so that a series of successive readings may be taken as rapidly as is desired. Timers of this general nature are conventionally available, and one such timer which is presently deemed to be satisfactory for use in the novel composite instrument is the Cramer Type 691, which is designated the "Totalizer." Further, it is to be noted that the timing component 16 should have an easily readable instrument face providing a digital readout of the time measurement, such as by an indicating needle or a series of rolling numerical digit wheels.

Having now fully indicated the nature of the components making up the composite instrument of the invention, and having also indicated the necessary interconnections, the operational use of the composite instrument is as follows. With the tachometer component 14 coupled to a desired engine 12 by a suitable drive 22, and with the output connectors 28 and 30 from the pickoff means 24 and 26, respectively, coupled to the timing component 16, the pickoffs or proximity switch means 24 and 26 are adjusted relative to the r.p.m. scale 18 of the tachometer component, so that pickoff 24 will detect the passage of the indicating needle 20 through a low engine speed indication, while pickoff 26 will detect the passage of the needle through a desired high engine speed indication.

The engine 12 is then started, and with the timing component 16 suitably reset, the engine is accelerated as fast as possible through the desired r.p.m. range. As the indicating needle sweeps past pickoff 24 the electrical pulse produced thereby actuates the timer 16 and it begins to count. As the indicating needle sweeps past pickoff 26 at the upper limit of the desired r.p.m. range, the electrical signal pulse produced thereby instantly stops the timer. Thus, an accurate reading will have been obtained of the actual time it took the engine to accelerate through the desired range. This reading may then be recorded or remembered, and a given parameter of engine operation may be slightly adjusted in order to determine what effect it may have. The timer is then reset and the engine once again accelerated at full throttle to once again automatically produce an accurate timer reading, which may be compared to the previous such reading.

Thus, the engine may rapidly be tuned to produce the lowest possible timer reading, at which point the engine should produce its maximum acceleration in the desired range. This constitutes the basic function and operation of the composite instrument, although it will be clear that certain variations in this operation may be made, such as by actually driving a vehicle in which the engine is mounted, or by loading its drive shaft so as to simulate expected load conditions. Also, the proximity switches or pickoffs 24 and 26 may be adjusted relative to the r.p.m. scale at any time so as to select any desired r.p.m. range in connection with which acceleration is desired to be maximized.

Having now thoroughly and clearly set forth the concept underlying the invention and having indicated preferred modes for embodying this concept, it will be clear that certain alternative embodiments of the concept may be provided, or that certain minor modifications and variations may be made, which nevertheless are based upon the concept here involved and incorporate the spirit of the invention. All such further embodiments, modifications, and variations, are therefore to be considered as within the scope of the claims appended hereinafter, unless these claims by their language specifically state otherwise.

I claim:

1. An engine performance indicator comprising a speed-responsive device, a timing device having starting and stopping means, and control means whereby said speed responsive device is operative at a first predetermined speed to start the timing device and the speed-responsive means is operative at a second predetermined speed to stop the said timing device whereby the timing device indicates the elapsed time for a predetermined change of speed to occur.

2. An engine performance indicating instrument comprising an assembly including a tachometer having an indicating dial and a timing device for indicating time, means actuatable by the tachometer to start the timing device in operation at a predetermined speed and means actuatable by the tachometer to stop the timing device at a second predetermined speed whereby to indicate the elapsed time for a predetermined change in speed to take place.

3. An engine performance indicator as in claim 2, wherein the means responsive to predetermined speeds comprises a control element carried by the shaft of the tachometer and a second control element positionable about the circumference of the tachometer.

4. An engine performance measurement instrument, comprising in combination: means connectable to an engine for monitoring the speed at which the engine is operating; a first pickoff means operatively coupled to said speed-monitoring means for providing a first triggering output signal when the speed of said engine reaches a predetermined low value; a second pickoff means operatively coupled to said speed-monitoring means for providing a second triggering output signal when the speed of said engine reaches a predetermined high value; and a timing component coupled to each of said pickoff means to receive their respective output signals; said timing component being triggered on and off by said first and second signals and measuring the time which elapses between receipt of such two signals, so that by comparing repeated elapsed time measurements an engine may be precisely tuned to provide maximum acceleration between a pair of known engine speeds.

5. An engine performance measurement instrument, comprising in combination: means connectable to an engine for continuously monitoring the speed at which the engine is operating; a first pickoff means operatively coupled to said speed-monitoring means for providing a first triggering electrical output signal when the speed of said engine reaches a predetermined low value; a second pickoff means operatively coupled to said speed-monitoring means for providing a second triggering electrical output signal when the speed of said engine reaches a predetermined high value; and a manually resettable electrically actuated timing component coupled to each of said pickoff means to receive their respective output signals; said timing component upon being reset being triggered on and off by said first and second electrical signals to measure the time which elapses between receipt of such two signals, so that by comparing repeated elapsed time measurements an engine may be precisely tuned to provide maximum acceleration between a pair of known engine speeds.

6. An engine performance measurement instrument, comprising in combination: tachometer means connectable to an engine for continuously monitoring the speed at which the engine is operating and having a meter movement including an instrument face for visually indicating the said operating speed; a first pickoff means operatively coupled to said tachometer for providing a first triggering electrical output signal when said meter movement indicates a predetermined low value of engine operating speed; a second pickoff means operatively coupled to said tachometer for providing a second triggering electrical output signal when said meter movement indicates a predetermined high value of engine operating speed; and a manually resettable electrically actuated timing component coupled to each of said pickoff means to receive their respective output signals; said timing component upon being reset being triggered on and off by said first and second electrical signals to measure the time which elapses between receipt of such two signals, so that by comparing repeated elapsed time measurements an engine may be precisely tuned to provide maximum acceleration between a pair of known engine speeds.

7. An engine performance measurement instrument, comprising in combination: tachometer means connectable to an engine for continuously monitoring the speed at which the engine is operating and having a meter movement including an instrument face and an indicating needle for visually indicating the said operating speed; a first proximity switch means positioned to be actuated by a portion of said indicating needle and arranged to provide a first triggering electrical output signal when said needle indicates a predetermined low engine speed; a second proximity switch means positioned to be actuated by a portion of said indicating needle and arranged to provide a second triggering electrical output signal when said needle indicates a predetermined high engine speed; and a manually resettable electrically actuated timing component coupled to each of said proximity switches to receive their respective output signals; said timing component upon being reset being triggered on and off by said first and second electrical signals to measure the time which elapses between receipt of such two signals, so that by comparing repeated elapsed time measurements an engine may be precisely tuned to provide maximum acceleration between a pair of known engine speeds.

8. The instrument defined in claim 7, wherein at least one of said proximity switch means is adjustably mounted relative to said instrument face and indicating needle, such that the engine speed at which such switch means actuates said timing component may be varied as desired.

9. The instrument defined in claim 7, wherein both of said proximity switch means are adjustably mounted relative to said instrument face and indicating needle, such that both engine speeds at which such switch means actuate said timing component may be varied as desired.

* * * * *